(12) United States Patent
Beaufrere et al.

(10) Patent No.: US 11,787,267 B2
(45) Date of Patent: Oct. 17, 2023

(54) TRAILER REFRIGERATION UNIT AND METHODS FOR LIMITING THE SUPPLY AIR TEMPERATURE THEREOF

(71) Applicant: Carrier Corporation, Palm Beach Gardens, FL (US)

(72) Inventors: Florian Beaufrere, Rouen (FR); Raymond L. Senf, Central Square, NY (US)

(73) Assignee: Carrier Corporation, Palm Beach Gardens, FL (US)

( * ) Notice: Subject to any disclaimer, the term of this patent is extended or adjusted under 35 U.S.C. 154(b) by 21 days.

(21) Appl. No.: 17/305,769

(22) Filed: Jul. 14, 2021

(65) Prior Publication Data

US 2022/0016957 A1 Jan. 20, 2022

Related U.S. Application Data

(60) Provisional application No. 62/705,772, filed on Jul. 15, 2020.

(51) Int. Cl.
*B60H 1/32* (2006.01)

(52) U.S. Cl.
CPC ......... *B60H 1/3205* (2013.01); *B60H 1/3226* (2013.01); *B60H 2001/3255* (2013.01); *B60H 2001/3283* (2013.01)

(58) Field of Classification Search
CPC .. B60H 1/3205; B60H 1/3226; B60H 1/2215; B60H 1/2218; B60H 1/2225; B60H 2001/3255; B60H 2001/3283; B60H 2001/3261; B60H 2001/3279;

(Continued)

(56) References Cited

U.S. PATENT DOCUMENTS

| 4,324,286 A | * | 4/1982 | Brett ................. G05D 23/1931 62/133 |
| 2003/0230106 A1 | * | 12/2003 | Takano ................. F25B 49/022 62/244 |
| 2005/0066671 A1 | | 3/2005 | Srichai |

(Continued)

FOREIGN PATENT DOCUMENTS

EP 26422271 9/2013

OTHER PUBLICATIONS

Search Report for EP 21182533.

*Primary Examiner* — Marc E Norman
(74) *Attorney, Agent, or Firm* — Patricia S. Whitehouse

(57) ABSTRACT

Disclosed is a method of operating a trailer refrigeration unit of a refrigerated trailer system comprising setting a cargo hold set point temperature through a user interface; urging an airflow along a flowpath from a return air inlet port, through an evaporator of the trailer refrigeration unit, and to a supply air outlet port of the trailer refrigeration unit; monitoring a return air temperature of the airflow flowing through the return air inlet port; monitoring a supply air temperature of the airflow flowing through the supply air outlet port; heating the airflow flowing through the supply air outlet port when the return air temperature is less than the cargo hold set point temperature; and stopping heating of the airflow flowing to the supply air outlet port when the return air temperature is less than the cargo hold set point temperature and the supply air temperature reaches a threshold.

16 Claims, 6 Drawing Sheets

(58) Field of Classification Search
CPC .... F25B 2400/0403; F25B 2700/21172; F25B 2700/21173; F25D 11/003
See application file for complete search history.

(56) References Cited

U.S. PATENT DOCUMENTS

| | | | |
|---|---|---|---|
| 2006/0042296 | A1 | 2/2006 | Ludwig |
| 2006/0161306 | A1* | 7/2006 | Federspiel ............... F24F 11/46 700/276 |
| 2012/0137713 | A1 | 7/2012 | Duraisamy |
| 2012/0318007 | A1* | 12/2012 | Lukasse ................. F25B 49/02 62/126 |

* cited by examiner

TRAILER REFRIGERATION UNIT AND METHODS FOR LIMITING THE SUPPLY AIR TEMPERATURE THEREOF

CROSS REFERENCE TO A RELATED APPLICATION

The application claims the benefit of U.S. Provisional Application No. 62/705,772 filed Jul. 15, 2020, the contents of which are hereby incorporated in their entirety.

BACKGROUND

Exemplary embodiments pertain to the art of providing a refrigerated environment in transportation systems. More particularly, the present disclosure relates to configurations of refrigerated trailer systems and methods of their operation.

A trailer refrigeration unit can be used to refrigerate cargo stored in a trailer during transport. The type of cargo kept in a particular trailer can vary widely and can depend on the interests of the trailer owner. In some circumstances, despite known best practices for loading cargo, workers can fail to load cargo in the optimal way which can lead to erroneous measurement of the trailer conditions and can negatively influence control aspects of refrigerated trailer systems and environmental conditions therein. Accordingly, there remains a need in the art for methods of operating a trailer refrigeration unit without negatively affecting the cargo even when it has been loaded in a less than optimal manner.

BRIEF DESCRIPTION

Disclosed is a method of operating a trailer refrigeration unit of a refrigerated trailer system comprising: setting a cargo hold set point temperature through a user interface; urging an airflow along a flowpath from a return air inlet port, through an evaporator of the trailer refrigeration unit, and to a supply air outlet port of the trailer refrigeration unit; monitoring a return air temperature of the airflow flowing through the return air inlet port; monitoring a supply air temperature of the airflow flowing through the supply air outlet port; heating the airflow flowing through the supply air outlet port when the return air temperature is less than the cargo hold set point temperature; and stopping heating of the airflow flowing to the supply air outlet port when the return air temperature is less than the cargo hold set point temperature and the supply air temperature reaches a threshold.

In addition to one or more of the above disclosed aspects or as an alternate, wherein reaches the threshold comprises the supply air temperature reaching a supply air upper temperature limit, the supply air temperature reaching and/or exceeding the supply air upper temperature limit for a first time duration, the supply air temperature reaching a maximum supply air temperature, the supply air temperature reaching and/or exceeding the maximum supply air temperature for a second time duration, the supply air temperature reaching a temperature offset from the cargo hold set point temperature, the supply air temperature reaching or exceeding the temperature offset from the cargo hold set point temperature, a time derivative of the supply air temperature reaching a derivative threshold value, or a combination comprising at least one of the foregoing.

In addition to one or more of the above disclosed aspects or as an alternate, wherein the heating the airflow further comprises activating a heating device disposed in thermal communication with the airflow, activating a hot gas bypass operation mode of the trailer refrigeration unit resulting in heating the airflow through the evaporator, or a combination comprising at least one of the foregoing; and wherein the stopping heating of the airflow further comprises de-energizing the heating device, de-activating the hot gas bypass operation, or a combination comprising at least one of the foregoing.

In addition to one or more of the above disclosed aspects or as an alternate wherein the stopping heating further comprises de-energizing one or more electric heaters disposed in thermal communication with the airflow.

In addition to one or more of the above disclosed aspects or as an alternate, wherein the stopping heating further comprises reducing a mass flow rate of refrigerant through a condenser bypass flowpath.

In addition to one or more of the above disclosed aspects or as an alternate, further comprising setting a heating mode supply air upper temperature limit equal to the cargo hold set point temperature plus an offset temperature.

In addition to one or more of the above disclosed aspects or as an alternate, wherein the offset temperature is from between 0.5° C. to 10° C.

Further disclosed is a refrigerated trailer system comprising: a fan for urging an airflow along a flowpath from a return air inlet port to a supply air outlet port, a vapor compression system comprising an evaporator, wherein the evaporator is disposed in thermal communication with the airflow, a return air temperature sensor for monitoring a return air temperature, a supply air temperature sensor for monitoring a supply air temperature, a controller in control communication with the vapor compression system, the return air temperature sensor, the supply air temperature sensor, wherein the controller is configured to heat the airflow when the return air temperature is less a cargo hold set point temperature, and to stop heating the airflow when the return air temperature is less than the cargo hold set point temperature and the supply air temperature reaches a threshold.

In addition to one or more of the above disclosed aspects or as an alternate, wherein reaches the threshold comprises the supply air temperature reaching a supply air upper temperature limit, the supply air temperature reaching and/or exceeding the supply air upper temperature limit for a first time duration, the supply air temperature reaching a maximum supply air temperature, the supply air temperature reaching and/or exceeding the maximum supply air temperature for a second time duration, the supply air temperature reaching a temperature offset from the cargo hold set point temperature, the supply air temperature reaching or exceeding the temperature offset from the cargo hold set point temperature, a time derivative of the supply air temperature reaching a derivative threshold value, or a combination comprising at least one of the foregoing.

In addition to one or more of the above disclosed aspects or as an alternate, wherein one or more heaters are disposed in thermal communication with the airflow, and the controller is configured in control communication with the one or more heaters.

In addition to one or more of the above disclosed aspects or as an alternate, wherein the controller further comprises a control loop configured to control the supply air temperature to a supply air temperature set point value.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
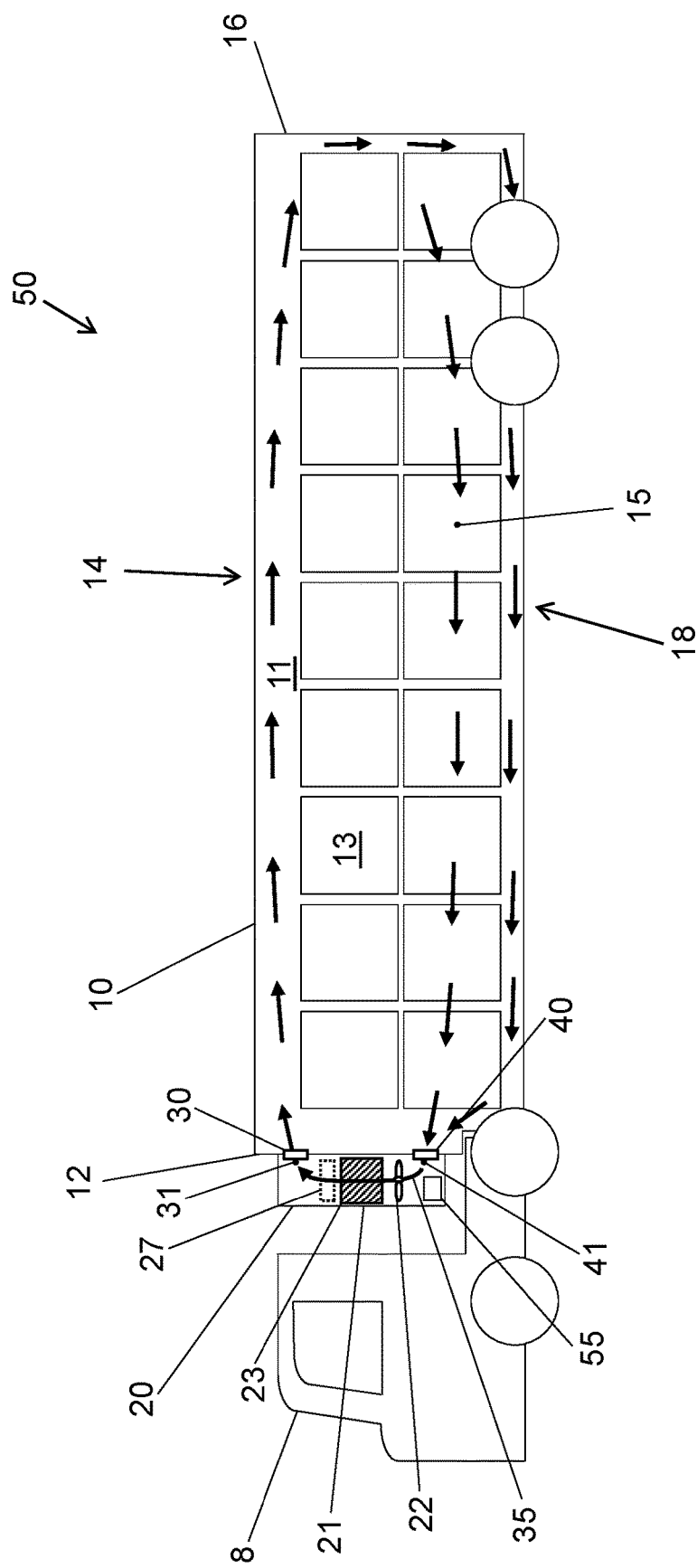
FIG. 1 is a schematic illustration of a cross sectional view of a refrigerated trailer system.

FIG. 1 is a schematic illustration of a cross sectional view of a refrigerated trailer system 50 including a trailer 10 and a trailer refrigeration unit 20 attached thereto. The trailer refrigeration unit 20 can include a fan 22 for urging an airflow along a flowpath 35 from a return air inlet port 40, through an evaporator 23 (e.g. centralized evaporator, or remote evaporator) of the trailer refrigeration unit 20, and to a supply air outlet port 30 of the trailer refrigeration unit 20. A return air temperature sensor 41 can be located in thermal communication with the airflow passing through the return air inlet port 40 and can be used to monitor the bulk air temperature of the airflow returning from a cargo hold 11 of the trailer 10. A supply air temperature sensor 31 can be located in thermal communication with the airflow passing through the supply air outlet port 30 and can be used to monitor the bulk air temperature of the airflow being supplied to the cargo hold 11 by the trailer refrigeration unit 20. Upon exiting the supply air outlet port 30 the airflow can be urged to the top 14 of the cargo hold 11. As the airflow traverses the length of the cargo hold 11 the flow path of the airflow can diverge. As it reaches the rear door 16 it can be directed toward the floor 18 and back through the cargo 13, where it can be drawn into the return air inlet port 40 (e.g., by a pressure gradient induced by the fan 22).

Manufacturers recommendations for loading cargo 13 in the cargo hold 11 can suggest to leave air gaps between goods and the front wall 12, (e.g., of from about 6 centimeters (cm) to about 12 cm), between goods and the side walls, (e.g., of at least about 2 cm to about 5 cm), and between goods and the rear door, (e.g., of about 10 cm). Further recommendations include minimizing, or eliminating, the use of wrappings (e.g., plastic wrap) as it can impede airflow to the goods (e.g., particularly around pallets of boxed goods) and avoiding mixing goods (e.g. a combination of fish, fruits, vegetables, meat, and the like) which can have varying thermal mass and average temperature upon loading and can result in non-uniform temperature distribution throughout the cargo hold 11 (e.g., hot and/or cold spots).

Accordingly, when properly loaded, cargo 13 can be arranged in the cargo hold 11 with open space for airflow along the front wall 12, side walls, top 14, the rear door 16, and the floor 18 of the cargo hold 11. Additional spacing between items of cargo 13 can allow for improved airflow to the items (e.g., individual pallets, boxes, containers, or goods therein).

Figure 2:
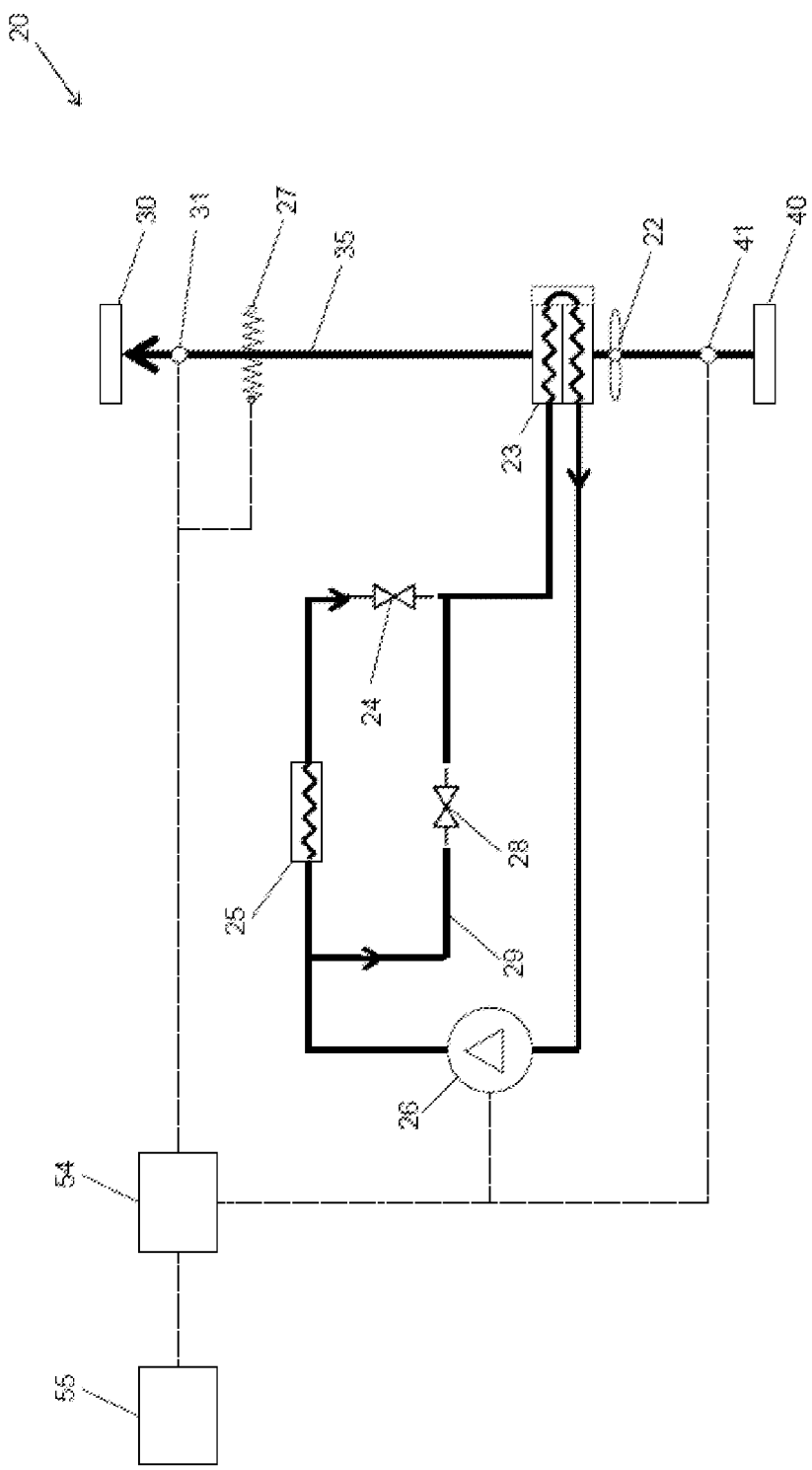
FIG. 2 is a schematic illustration of a trailer refrigeration unit of the refrigerated trailer system.

FIG. 2 is a schematic illustration of the trailer refrigeration unit 20. The trailer refrigeration unit 20 can include a controller 54 configured to operate to heat the supply airflow or to cool the supply airflow flowing along flowpath 35. For example, the trailer refrigeration unit 20 can include a vapor compression system including an evaporator 23, an expansion device 24, a condenser 25, and a compressor 26. The trailer refrigeration unit 20 can cool the supply airflow flowing along flowpath 35 (e.g., entering return air inlet port 40) by passing it across the evaporator 23 disposed in thermal communication with supply airflow, which can absorb heat from the airflow. The trailer refrigeration unit 20 can heat the supply airflow by passing it across one or more optional heaters 27 (e.g., an electric heater, a hydrocarbon fueled heater, or the like) disposed in thermal communication with the airflow flowing along flowpath 35. For example, the trailer refrigeration unit 20 can include a first heater and a second heater disposed in thermal communication with the airflow flowing through the supply air outlet port 30. A first heater can have a higher heat output than a second heater. The trailer refrigeration unit 20 can be configured to partially or fully heat individual heaters of the one or more heaters 27, or heat any combination thereof. For example, the trailer refrigeration unit 20 can include a first heater and a second heater and can be configured to heat the first heater, the second heater, or both heaters, allowing for three non-zero heat output settings to heat the supply airflow. In this way, the number of heat output settings for heating the supply airflow can be a function of the number of discrete heaters in the refrigerated trailer. Further, the heat output of an individual heater or a group of heaters can be controlled (e.g., by the electrical power supplied to the heater, by the flow of fuel and/or air to the heater, or the like) which can allow for further refinement of the heater output as a function of conditions of the refrigerated trailer system 50. In an example, the trailer refrigeration unit 20 can include a first heater having a thermal output capacity of about 5,250 Watts (W) and a second heater having a thermal output capacity of about 3,450 W disposed in thermal communication with the airflow flowing along flowpath 35. In another example, the trailer refrigeration unit 20 can include a first heater and a second heater having equal thermal output capacity of about 3,960 W disposed in thermal communication with the airflow flowing along flowpath 35. Further, when electric heaters are used the one or more heaters 27 can be configured for any suitable power source, including alternating current (AC) or direct current (DC) power sources, for example 580 Volts AC (VAC) at 65 Hertz (Hz), or 480 VAC at 60 Hz, and the like.

Optionally, the trailer refrigeration unit 20 can be configured to heat the supply airflow (e.g., increase the total enthalpy, or to reduce the cooling potential of the supply airflow) without the use of one or more heaters 27, or in addition to heaters 27. For example, optionally, hot refrigerant can be transferred from the high pressure side of the vapor compression cycle (e.g., upstream of the expansion device 24) directly to the low pressure side (e.g., compressor 26 inlet) without passing through the condenser 25. This can be done by opening optional hot gas bypass valve 28 to allow refrigerant to bypass the condenser 25 along optional flowpath 29. This action can increase the suction temperature of the cycle and result in increased refrigerant temperatures throughout the cycle—thereby increasing the temperature of refrigerant flowing through the evaporator 23 and increasing the temperature capacity of supply airflow flowing therethrough. The same effect can also be achieved by utilizing a three-way valve in addition to, or in replacement of, the optional hot gas bypass 28 and/or expansion device 24. The use of a hot bypass valve 28 can be combined with the use of one or more heaters 27 to heat the supply airflow flowing to the supply air outlet port.

The refrigerated trailer system 50 can be operated to cool the cargo 13 to a cargo hold set point temperature which can be set by the operator of the refrigerated trailer system 50. For example, the operator of the refrigerated trailer system 50 can set the cargo hold set point temperature using a control interface 55 of the refrigerated trailer system 50. The cargo hold set point temperature can be set to any suitable temperature. For example, the cargo hold set point temperature can be set to any value from about −12° C. to about 20° C. inclusive, or from about −5° C. to about 18° C. inclusive, or from about −2° C. to about 18° C. inclusive, or from about −1° C. to about 18° C. inclusive, or from about 0° C. to about 18° C. inclusive, or from about 0° C. to about 4° C. inclusive, or from about 0° C. to about 3° C. inclusive. In particular, the cargo hold set point temperature can be set to about −1° C., or about 0° C., or about 1° C., or about 2° C., or about 3° C., or about 4° C. or about 5° C., or about 6° C., or about 7° C., or about 8° C., or about 9° C., or about 10° C., or about 11° C., or about 12° C., or about 13° C., or about 14° C., or about 15° C., or about 16° C., or about 17° C., or about 18° C. The cargo hold set point temperature can be set to decimal values between the aforementioned ranges as well, e.g. set to 2.5° C., 3.5° C., 4.5° C. and the like.

The control interface 55 can include any suitable interface for the operator to set the cargo hold set point temperature. For example, the control interface 55 can include a mobile phone software application, a control panel disposed in control communication with a controller of the refrigerated trailer system 50 (e.g., a control panel disposed in the cab 8 of the refrigerated trailer system 50, a control panel disposed on a housing 21 of the trailer refrigeration unit 20, a control panel disposed on an interior wall of the trailer 10 of the trailer refrigeration unit 20, or the like). The trailer refrigeration unit 20 can be operated to maintain the return air temperature sensor 41 at the set cargo hold set point temperature. For example, an operator can select 3° C. as the cargo hold set point temperature (e.g., on a control app on their mobile phone). In response, the trailer refrigeration unit 20 can automatically increase, or decrease, the supply air temperature, as measured by the supply air sensor 31, in an effort to bring the return air temperature (e.g., as measured by the return air inlet sensor 41) in line with the cargo hold set point temperature. A trailer or cargo temperature sensors 15 can be configured to further influence the supply airflow temperature control.

In some situations, the best practices of cargo loading can be ignored or overlooked. This can result in cargo 13 that is disposed too close to the front wall 12, the side walls, top 14, rear door 16, and/or floor 18 of the cargo hold 11, or cargo 13 that sits too closely to one or more trailer and/or cargo temperature sensors 15 disposed in the cargo hold 11. When cargo is placed in ways that reduce the space for airflow to, around, and/or through, the cargo 13 (e.g., against side walls, ceiling, front wall 12, or rear door 16, or on the floor 18 without pallets underneath, packed too close together within the cargo hold 11), are covered with wrappings, or when types of cargo are mixed it can result in hot and/or cold spots in the cargo hold 11 due to inadequate airflow distribution around the cargo 13. Further, when cargo is located too closely to trailer and/or cargo temperature sensors 15 it can erroneously influence control aspects of the trailer refrigeration unit 20, such as the supply air temperature control.

The applicants have found that even when trailers are loaded with little, or no, regard for at least the aforementioned best loading practices, the disclosed methods are capable of maintaining the environmental conditions of the cargo hold 11 while not exceeding maximum supply air temperatures which could lead to cargo loss.

Figure 3:
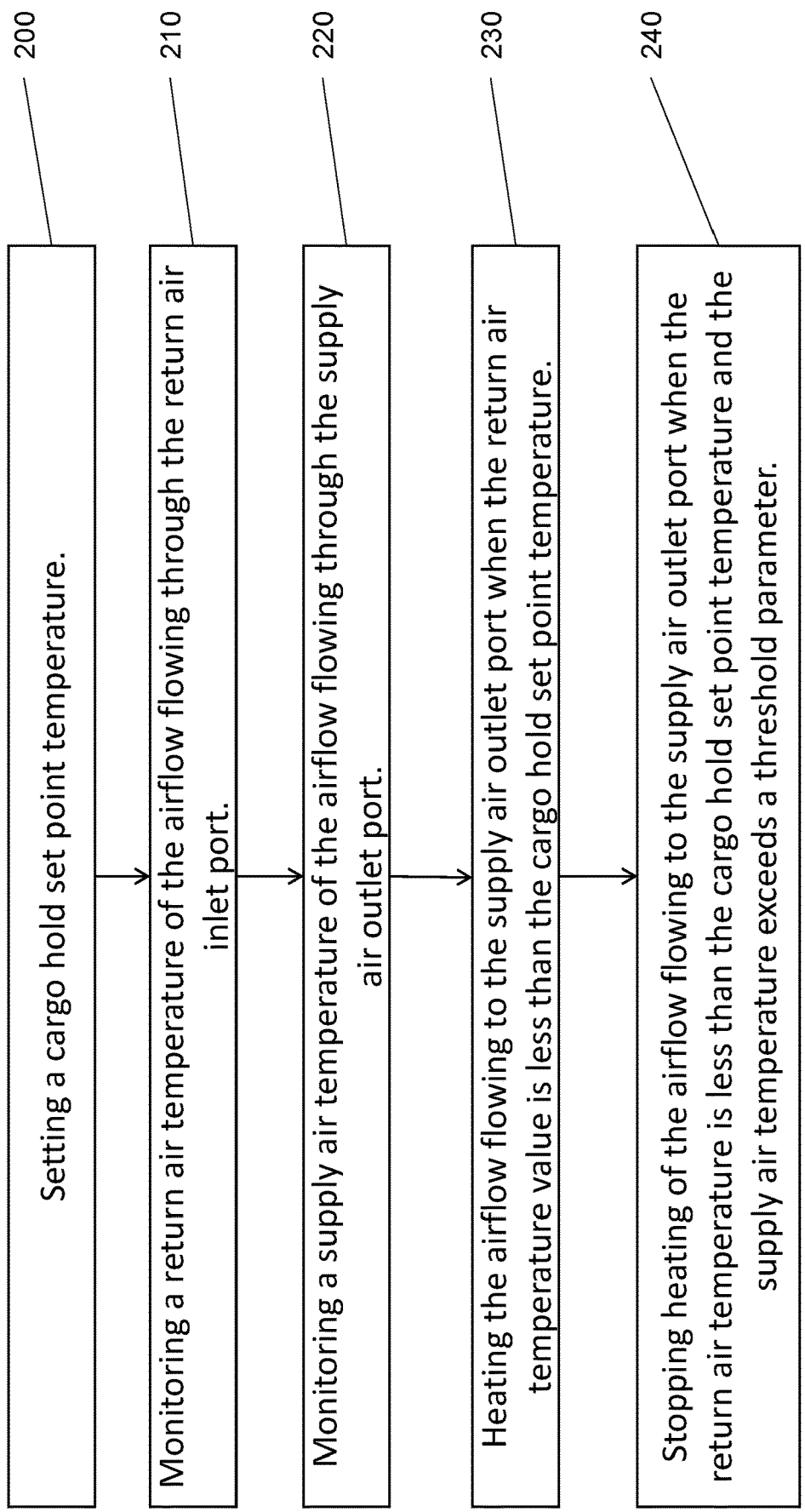
FIG. 3. is a schematic illustration of the methods operating refrigerated trailer system.

As shown in FIG. 3, a first aspect 200 of the disclosed methods can include setting the cargo hold set point temperature. The setting of the cargo hold set point temperature can be done manually by an operator of refrigerated trailer system 50, automatically by the controller 54 in response to one or more control parameters of the control system, or can be done by a combination of manual and automatic control. The cargo hold set point temperature can be set remotely by an operator utilizing a remote control interface 55 (e.g., mobile phone, central station, and the like). For example, the cargo hold set point temperature can be set automatically by a schedule entered manually by the operator or can be set by the type of cargo (e.g., where an operator enters the type of cargo and a corresponding default cargo hold set point temperature is adopted by the controller).

A second aspect 210 of the disclosed methods can include monitoring the return air temperature of the airflow flowing through the return air inlet port 40. The return air temperature can be monitored by the return air temperature sensor 41. The return air temperature sensor 41 can be disposed in any suitable location to detect the bulk air temperature of the return air stream. For example, the return air temperature sensor 41 can be located at the return air inlet port 40, in a conduit extending between the return air inlet port 40 and the fan 23, or the like.

A third aspect 220 of the disclosed methods can include monitoring the supply air temperature of the airflow flowing through the supply air outlet port 30. The supply air temperature can be monitored by the supply air temperature sensor 31. The supply air temperature sensor 31 can be disposed in any suitable location to detect the bulk air temperature of the supply air stream. For example, the supply air temperature sensor 31 can be located at the supply air outlet port 30, in a conduit extending between the fan 23 and the supply air inlet port 40, or the like.

A fourth aspect 230 of the disclosed methods can include heating the airflow flowing to the supply air outlet port 30 when the return air temperature is less than the cargo hold set point temperature. When the return air temperature is below the cargo hold set point temperature the trailer refrigeration unit can operate in a heating mode. Heating mode can include, stopping cooling air flowing along flowpath 35 (e.g., stopping the compressor 25 of the vapor compression system), supplying heat to the air flowing along flowpath 35, or a combination thereof, in order to raise the temperature of the supply air flowing out of supply air outlet port 30 and to bring the temperature of the cargo 13 up to the cargo hold set point temperature. The heating can include heat supplied by one or more heaters 27 disposed in thermal communication with the airflow flowing along the flowpath 35 to and/or through the supply outlet port 30. The one or more heaters 27 can include electrically powered heaters. The one or more heaters 27 can include hydrocarbon fuel powered heaters, or equivalent thereof, that heat the air through a combustion process.

A fifth aspect 230 of the disclosed methods can include stopping heating of the airflow flowing to the supply air outlet port 30 when the return air temperature is less than the cargo hold set point temperature and the supply air temperature exceeds a threshold. The stopping heating can include deactivating the one or more heaters 27 for a timed cool down. The duration of the timed cool down can be set by an operator of the trailer refrigeration system 50 (e.g., using the control interface 55), or can be preset by the system manufacturer. The threshold can include a supply air temperature limit (e.g., as measured by the supply air temperature sensor 31) or proxy thereof, a return air inlet temperature limit (e.g., measured by the return air temperature sensor 41) or proxy thereof, an offset temperature from the cargo hold set point temperature (e.g., maximum offset from the cargo hold set point temperature as measured by the return air temperature sensor 41), a maximum trailer and/or cargo temperature (e.g., as measured by trailer and/or cargo temperature sensors 15), a rate of change of the one or more of the said temperatures, or the like. For example, the controller 54 can be configured to deactivate, or reduce the thermal output, of one or more of the one or more heaters 27 when the supply air temperature reaches a supply air temperature limit. Further, when a hot gas bypass operation is included in the vapor compression system, the controller 54 can be configured to shut the hot gas bypass flowpath 29 (e.g., by closing hot gas bypass valve 28 or a functionally equivalent three-way valve) when the supply air temperature reaches the supply air temperature limit.

For example, once the supply air temperature exceeds a supply air temperature limit for a specified duration (e.g., 30 seconds) the heater 27 can be deactivated (e.g., to no longer supply heat). The supply air temperature limit can be set as a function of the cargo hold set point temperature. For example, the supply air temperature limit can be set to from about 0° C. to about 20° C., or from about 2.5° C. to about 10.0° C. greater than the cargo hold set point temperature. For example, the supply air temperature limit can be set to be greater than the cargo hold set point temperature by about 2.5° C., or about 3.0° C., or about 3.5° C., or about 4.0° C., or about 4.5° C., or about 5.0° C., or about 5.5° C., or about 6.0° C., or about 6.5° C., or about 7.0° C., or about 7.5° C., or about 8.0° C., or about 8.5° C., or about 9.0° C., or about 9.5° C., or about 10.0° C. The supply air temperature limit can be set to decimal values between the aforementioned ranges as well, e.g. set to 2.5° C., 3.5° C., 4.5° C. and the like. In an embodiment, when in heating mode (e.g., when the return air temperature is below the cargo hold set point temperature) and the supply air temperature sensor 31 indicates the supply air temperature exceeds 3° C. more than the cargo hold set point temperature for 30 seconds the one or more heaters 27 can be deactivated (e.g., electrically de-energized, flow of fuel stopped, or the like).

Once deactivated, the one or more heaters 27 can remain deactivated for an off time duration to allow the temperature distribution of the cargo to even out and become more uniform before re-activating the one or more heaters 27.

As an alternative, or in addition, to an on/off heater control, the heaters thermal output can be controlled based on the supply air temperature sensor 31. For example, the one or more heaters 27 can be driven by a control loop including a proportional, integral, and/or differential controller that can modulate the heater output power based on the measured supply air temperature. A proportional, integral, and/or differential controller can utilize a difference between a supply air temperature and a supply air temperature set point, an integral of said difference over time, and/or the time derivative of said difference, to influence the thermal output of the one or more heaters 27. In this way, the controller 54 can reduce or eliminate the cyclic up/down temperature changes associated with an on/off heater control approach. Further, a pulse width modulation controller can be used to modulate the heat output of the one or more heaters 27 in response to a control parameter (e.g., supply air temperature, return air temperature, cargo temperature, or the like) of the refrigerated trailer system 50. The pulse width modulation controller can modulate the length of time that a discretely activated heater of the one or more heaters 27 is activated. For example, the pulse width modulation controller can respond to a decrease in supply air temperature by extending the time the heater is activated versus the time the heater is deactivated over a given interval which can add more heat to the supply air flow and correspondingly increase the supply air temperature.

Figure 4:
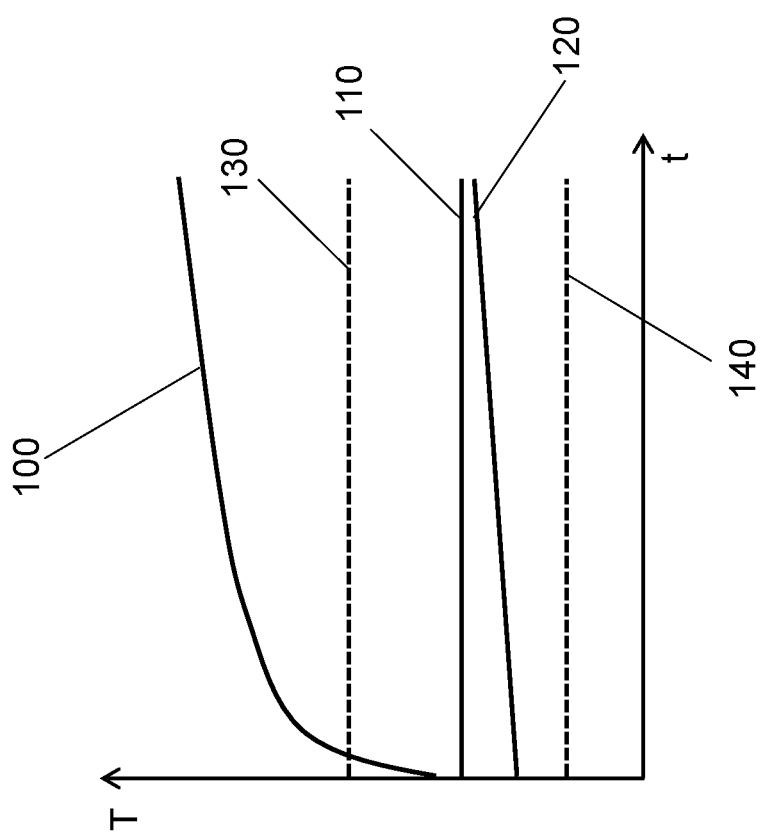
FIG. 4 is a schematic illustration of parameters of the trailer refrigeration unit in heating mode without supply air temperature limitations.

FIG. 4 is a schematic illustration of temperatures of the refrigerated trailer system 50 during heat mode without any supply air temperature limit. These conditions can result from improper loading of cargo 13 into the cargo hold 11. For example, when best practices for loading cargo 13 are not followed as previously described. During heat mode, the return air temperature 120 is below the cargo hold set point temperature 110. As a result, one or more heaters 27 can be activated, causing a sharp increase in the supply air temperature 100 and a corresponding rise in the return air temperature 120. Without a supply air temperature limit, the supply air temperature 100 can increase past a maximum supply air temperature 130 even as the return air temperature 120 remains below the cargo hold set point temperature 110. This can unnecessarily expose cargo 13 to air temperatures above the maximum supply air temperature 130 (e.g., set in the controller 54 by the operator).

Figure 5:
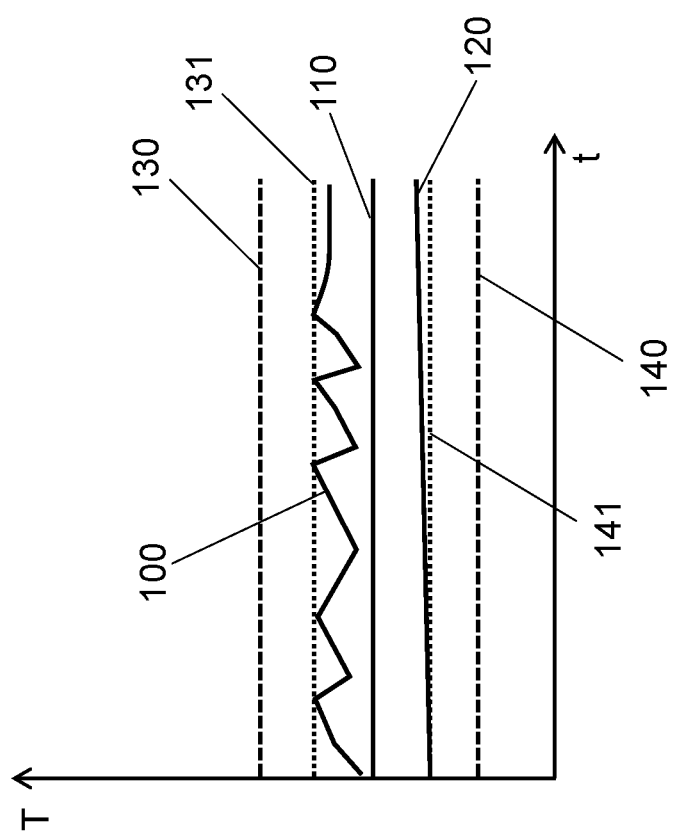
FIG. 5 is a schematic illustration of parameters of the trailer refrigeration unit in heating mode with supply air temperature limitations.
Figure 6:
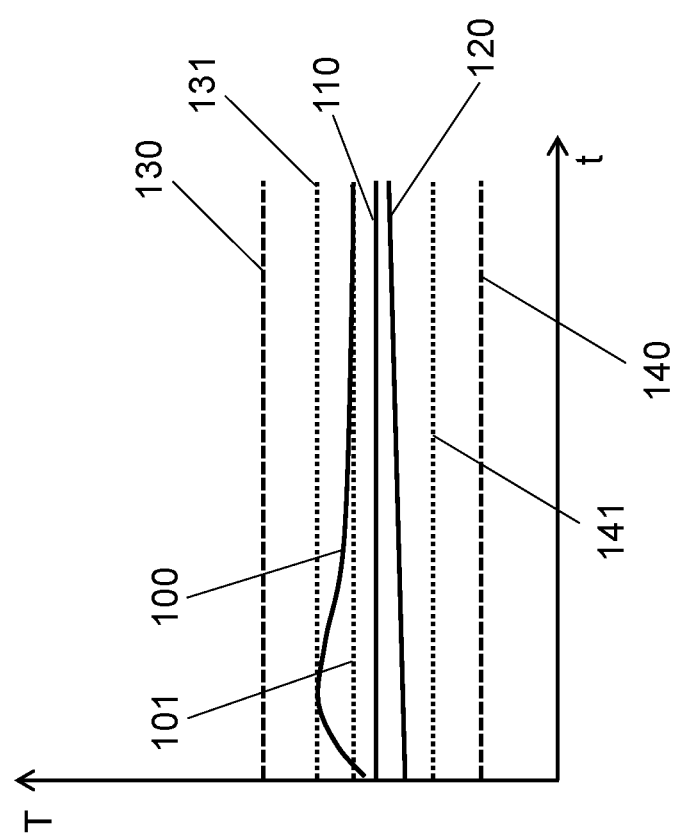
FIG. 6 is a schematic illustration of parameters of the trailer refrigeration unit in heating mode with supply air temperature limitations.

FIGS. 5-6 are schematic illustrations of temperatures of the refrigerated trailer system 50 during heat mode with a supply air temperature limit. In FIG. 5, the refrigerated trailer system 50 can include one or more electric heaters 27 for heating the supply air. During heat mode, the return air temperature 120 can be below the cargo hold set point temperature 110. As a result, the one or more electric heater 27 can be activated until the supply air temperature 100 reaches a supply air upper temperature limit 131. Upon reaching the supply air upper temperature limit 131, or after reaching and/or exceeding the supply air upper temperature limit 131 for a set time duration, the heater 27 can then be deactivated which can result in a corresponding decrease in supply air temperature 100 until the one or more heaters is reactivated.

Reactivation of the heater 27 can be based on a wait time, such as a minimum time for the one or more heaters 27 to remain deactivated (e.g., an off time). For example, upon deactivating the one or more heaters they can remain deactivated for a minimum time period of less than or equal to 30 minutes, or 15 minutes, or 10 minutes or 7 minutes, or 5 minutes or 3 minutes or 1 minute, or the like. The controller 54 can adjust, truncate, reset, or otherwise disregard this minimum time period based on another parameter of the refrigerated trailer system 50 (e.g., a measured or calculated control parameter, or the like). For example, the deactivated time can be reset, or otherwise disregarded, by the controller 54 if the return air temperature 120 decreases to a minimum return air temperature 140, the supply air temperature 100 falls to a supply air lower temperature limit 141 (e.g., preset by the operator, set as a function of the cargo hold set point temperature 110, or the like), an alarm condition is issued by the controller 54, or the like. Once reactivated, the heater 27 can remain activated until it reaches, or reaches and/or exceed the supply air upper temperature limit 131 for a preset time duration as previously described. This on and then off cycling of heat being transferred to the supply air flow by the one or more heaters 27 results in the increase and following decrease in the supply air temperature 100.

In FIG. 6, the refrigerated trailer system 50 can include one or more adjustable output heaters 27 for heating the supply air. During heat mode, the return air temperature 120 can be below the cargo hold set point temperature 110. As a result, the heat output of the one or more adjustable output heater 27 can be adjusted until the supply air temperature 100 reaches a supply air set point temperature 101. The supply air set point temperature can be preset by the operator, can be a function of the cargo hold set point temperature 110, or the like. Once the return air temperature reaches the cargo hold set point temperature 110 the trailer refrigeration unit can transition out of heating mode to cooling mode.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A method of operating a trailer refrigeration unit of a refrigerated trailer system comprising:
   setting a cargo hold set point temperature through a user interface;
   urging an airflow along a flowpath from a return air inlet port, through an evaporator of the trailer refrigeration unit, and to a supply air outlet port of the trailer refrigeration unit;
   monitoring a return air temperature of the airflow flowing through the return air inlet port;
   monitoring a supply air temperature of the airflow flowing through the supply air outlet port;
   heating the airflow flowing through the supply air outlet port when the return air temperature is less than the cargo hold set point temperature; and
   stopping heating of the airflow flowing to the supply air outlet port when the return air temperature is less than the cargo hold set point temperature and the supply air temperature reaches a threshold wherein heating the airflow further comprises activating one or more electric heaters disposed in thermal communication with the airflow, activating a hot gas bypass operation mode of the trailer refrigeration unit or activating one or more electric heaters disposed in thermal communication with the airflow and activating a hot gas bypass operation mode, resulting in heating the airflow through the evaporator, and
   wherein stopping heating of the airflow further comprises de-energizing the one or more electric heaters for a timed duration, de-activating the hot gas bypass operation, or both.

2. The method of claim 1, wherein reaching the threshold comprises the supply air temperature reaching a supply air upper temperature limit, the supply air temperature reaching a maximum supply air temperature, the supply air temperature reaching a temperature offset from the cargo hold set point temperature, the supply air temperature reaching or exceeding the temperature offset from the cargo hold set point temperature, or a combination comprising at least one of the foregoing.

3. The method of claim 2, wherein stopping heating further comprises reducing a mass flow rate of refrigerant through a condenser bypass flowpath.

4. The method of claim 1, wherein stopping heating further comprises reducing a mass flow rate of refrigerant through a condenser bypass flowpath.

5. The method of claim 1, further comprising setting a heating mode supply air upper temperature limit equal to the cargo hold set point temperature plus an offset temperature.

6. The method of claim 5, wherein the offset temperature is from between 0.5° C. to 10° C.

7. The method of claim 1, wherein reaching the threshold comprises the supply air temperature reaching or exceeding the supply air upper temperature limit for a first time duration, the supply air temperature reaching or exceeding the maximum supply air temperature for a second time duration, a time derivative of the supply air temperature reaching a derivative threshold value, or a combination thereof.

8. A refrigerated trailer system comprising:
   a fan for urging an airflow along a flowpath from a return air inlet port to a supply air outlet port,
   a vapor compression system comprising an evaporator, wherein the evaporator is disposed in thermal communication with the airflow,
   a return air temperature sensor for monitoring a return air temperature,
   a supply air temperature sensor for monitoring a supply air temperature,
   a controller in control communication with the vapor compression system, the return air temperature sensor, the supply air temperature sensor, wherein the controller is configured to heat the airflow when the return air temperature is less than a cargo hold set point temperature, and to stop heating the airflow for a timed duration when the return air temperature is less than the cargo hold set point temperature and the supply air temperature reaches a threshold.

9. The refrigerated trailer system of claim 8, wherein reaching the threshold comprises the supply air temperature reaching a supply air upper temperature limit, the supply air temperature reaching a maximum supply air temperature, the supply air temperature reaching a temperature offset from the cargo hold set point temperature, the supply air temperature reaching or exceeding the temperature offset from the cargo hold set point temperature, or a combination comprising at least one of the foregoing.

10. The refrigerated trailer system of claim 9, wherein one or more heaters are disposed in thermal communication with the airflow, and the controller is configured in control communication with the one or more heaters.

11. The refrigerated trailer system of claim 9, wherein the controller further comprises a control loop configured to control the supply air temperature to a supply air temperature set point value.

12. The refrigerated trailer system of claim 9, wherein one or more heaters are disposed in thermal communication with the airflow, and the controller is configured in control communication with the one or more heaters and wherein the controller further comprises a control loop configured to control the supply air temperature to a supply air temperature set point value.

13. The refrigerated trailer system of claim 9, wherein reaching the threshold comprises the supply air temperature reaching or exceeding the supply air upper temperature limit for a first time duration, the supply air temperature reaching or exceeding the maximum supply air temperature for a second time duration, a time derivative of the supply air temperature reaching a derivative threshold value, or a combination thereof.

14. The refrigerated trailer system of claim 8, wherein one or more heaters are disposed in thermal communication with the airflow, and the controller is configured in control communication with the one or more heaters.

15. The refrigerated trailer system of claim 8, wherein the controller further comprises a control loop configured to control the supply air temperature to a supply air temperature set point value.

16. The refrigerated trailer system of claim 8, wherein one or more heaters are disposed in thermal communication with the airflow, and the controller is configured in control communication with the one or more heaters and wherein the controller further comprises a control loop configured to control the supply air temperature to a supply air temperature set point value.

\* \* \* \* \*